Jan. 3, 1933.                J. P. TARBOX                 1,892,754
           METHOD OF FORMING INTERIOR ANGLE IN SHEET METAL STAMPING
                           Filed July 10, 1930
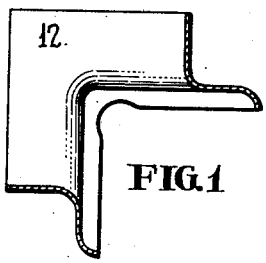
FIG. 1
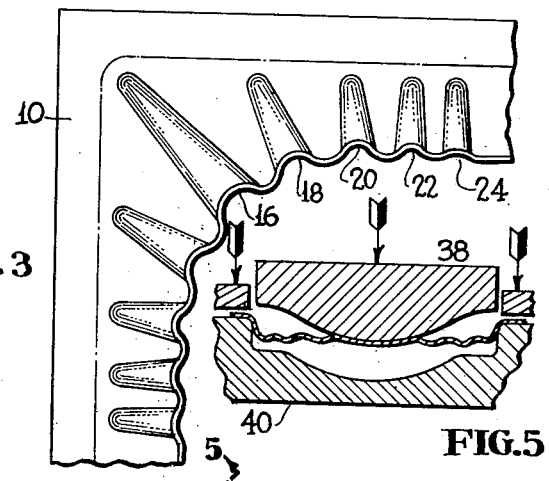
FIG. 3
FIG. 5
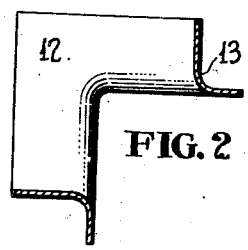
FIG. 2
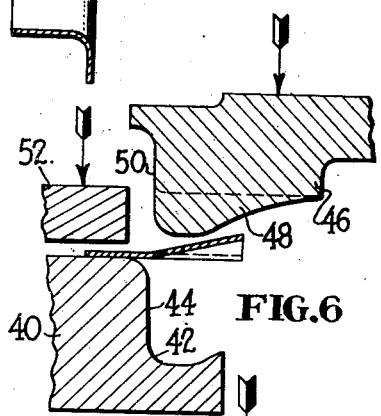
FIG. 6
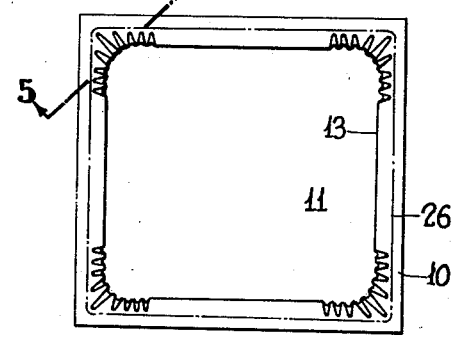
FIG. 4
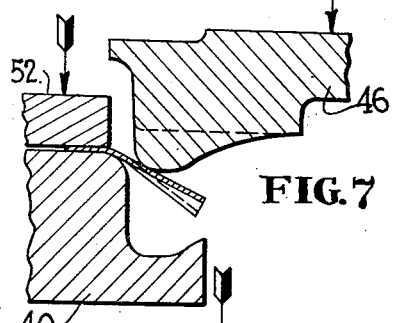
FIG. 7
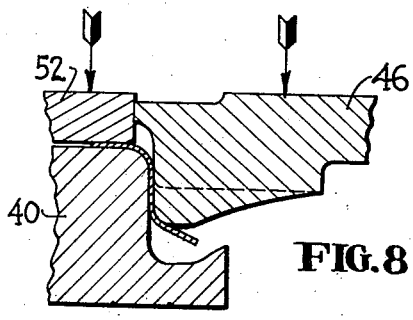
FIG. 8
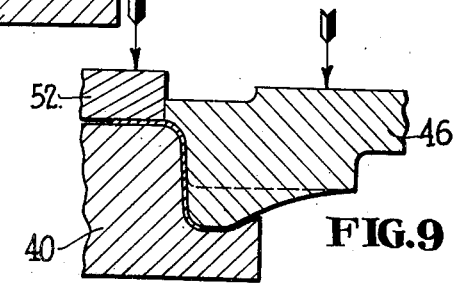
FIG. 9
INVENTOR.
John P. Tarbox

UNITED STATES PATENT OFFICE

JOHN P. TARBOX, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

METHOD OF FORMING INTERIOR ANGLE IN SHEET METAL STAMPING

Application filed July 10, 1930. Serial No. 467,072.

This invention relates to sheet metal constructions and more particularly to a method for forming a continuous flange at a corner of a rectangular sheet metal panel or the like. The invention is particularly related to sheet metal window panels and to a method of forming the same, but the principles of the present invention may be extended for use in connection with any manner of angular frames, panels, receptacles or the like.

In the manufacture of vehicle bodies, and particularly in the manufacture of automobile bodies of the sedan type, in which pressed sheet metal is generally used, it is customary to form a sheet metal panel of a shape conforming to the shape of the window opening and having a continuous integral flange which extends into and closely fits the window opening, or which, in itself, may provide the window opening, such window opening being ordinarily rectangular in shape or at least of quadrilateral form. The continuous flange which projects into the window opening or comprises the window opening must ordinarily have angular corners corresponding to the angular corners of the window opening.

Previously, in the manufacture of these window panels, in order to form the angularly projecting flange at the corners, it has been customary to draw or flatten out the material by a single large indentation in order to increase the area of the sheet metal which forms the angular corners of the continuous flange. In another process, the metal has been cut and an angular gusset piece has been welded to bridge the cut portions. Both of these methods have proven unsatisfactory, for, even with expert workmanship, the final finished product has been found, in the first instance, to be extremely weak because of the shortage of sheet material that can uniformly be supplied at the corner, and in the second instance, the difficulties encountered during welding are such that imperfections frequently result.

The second method is now in general use and has been disclosed in the patent to G. W. Wells, No. 1,545,021 issued July 7, 1925. In this method, provision is made for the cutting of an elongated slot at the corners of the sheet material from which the panel is to be formed, and within this slot is welded an angular gusset piece. Subsequently the angular flange may be formed by spreading the gusset so that the material of the gusset supplies the extra metal necessary for the corners. In this method, considerable difficulty has been encountered as the gusset member is not readily susceptible to the welding operation due, first, to the fact that proper pressure cannot be supplied to the abutting edges of the material to be welded, and secondly, because considerable material is consumed by the welding operation itself.

The present invention is designed as an improvement on the methods now in general use for forming continuous angular flanges. The invention contemplates forming a continuous angular flange adapted to extend into or form a window opening or the like, without the necessity of supplying additional foreign material at the corner, thereby completely eliminating the necessity of performing a welding operation which frequently is unsuccessful. More specifically, the invention contemplates a method whereby the material adjacent the corners to be formed may uniformly be drawn, and whereby the material remote from the corner may also be drawn and brought into the corner by a die pressing operation to supply the corner with the additional material necessary for forming a continuous annular flange. By the method employed, in carrying out the present invention, a minimum amount of labor is involved and the use of additional material has been eliminated.

Other objects of the invention not at this time particularly enumerated will become more readily apparent as the nature of the invention is better understood, and the same consists in the combination and arrangement of parts shown in the accompanying one sheet of drawing, in which, Fig. 1 is a fragmentary perspective view showing one corner of a window panel manufactured in accordance with the present invention.

Fig. 2 is a view similar to Fig. 1 showing the completed corner trimmed and in condition for use.

Fig. 3 is a fragmentary plan view illustrating one step in the manufacture of the window panel.

Fig. 4 is a plan view further illustrating a step in the method employed in manufacturing the panels.

Fig. 5 is a sectional view taken substantially along the line 5—5 of Fig. 4 showing the dies acting on the material.

Fig. 6 is a sectional view taken substantially along the line 6—6 of Fig. 4, also showing the dies in position, and Figs. 7, 8 and 9 are views similar to Fig. 6 illustrating successive steps undertaken in the die pressing operation.

In all of the above described views, similar characters of reference are employed to designate similar parts throughout. A rectangular piece of sheet material is shown at 10 and this sheet metal piece is provided with a rectangular shaped opening 11 and is adapted to be subsequently shaped into the form of a window panel having a front portion 12 and a continuous flange 13 of a shape corresponding to the shape of the window opening and adapted either to be inserted into the window opening or to comprise in itself the window opening. In shaping the material to the desired form and thus carrying out the present invention, a number of corrugations 16, 18, 20, 22 and 24 are formed in the material adjacent the corners which subsequently is to form the continuous flange. A score line may be provided as at 26 to mark off the portion which forms the flange from the remaining or front portion of the window panel. While these corrugations may be formed of any desirable size or shape, it is preferable, where a simple continuous flange is to be formed, to form these corrugations of tapered form, as shown in Fig. 3. In this figure a comparatively large sinuous corrugation is formed in the sheet material which subsequently forms the flange, diagonally on the bisector of the angle to be formed, additional corrugations being formed divergingly about this bisector as an axis, such corrugations being gradually diminished in size remote from the corner to be formed and gradually assuming an angle of 90° with respect to the nearest side of the rectangular frame. The material from which the flange 13 is formed is, when corrugated, as disclosed above, adapted to be bent to form the continuous flange, the material of the corrugations becoming opened out to form a uniformly angular flange.

The corrugations may be formed in any suitable manner and may, if desired, be made merely by crimping the material adjacent the corner. However, for the best results, it is preferable that the corrugations be formed by suitable dies, not shown, but which are of such a form as to form corrugations in the material as shown, to materially increase the area of the sheet material at points adjacent the corner to be formed. It is also preferable that the corrugations be formed of such size and in such a manner that they will increase the area of the sheet material adjacent the corner to be formed by an amount sufficient that the subsequent die pressing operation may be performed without the danger of rupturing the material as the slack provided by the corrugations is taken up and the operation of the actual drawing of the corner is performed. In other words, the corrugations provide an increased amount of material adjacent the corner which is sufficient to permit the subsequent die pressing operation to be performed insuring at least sufficient material for evenly drawing the corners.

As shown in Fig. 5, the metal forming the corrugations is actually drawn metal, and therefore, it is obvious that this metal must necessarily be stressed beyond its elastic limit to produce permanent deformation. The amount of material produced by the draw may be varied to suit various manufacturing conditions. Where the material employed is readily susceptible to the drawing operation, less excess metal need be furnished by the drawing than where the material is comparatively brittle. As a general rule, however, it is preferable that sufficient metal be produced by the draw to permit the final drawing of the material into the flange to be performed without undue strain.

While the metal forming the corrugations is drawn metal, the metal between the corrugations, or in the lands, remains substantially the same. During the final drawing operation of forming the flange, these lands are first acted upon and drawn beyond their elastic limit until these lands attain an elastic limit substantially the same as the elastic limit attained by the corrugations during the preceeding drawing operation. When this condition exists and the elastic limit of the material which forms the flange is substantially uniform, even drawing of the flange takes place and the material formerly forming the corrugations, together with the material formerly forming the lands, are uniformly drawn beyond their elastic limit to completely eradicate all trace of the first deformation, and thus the flange formed is continuous and regular in its appearance and attains the form shown in Figure 1. The excess material is then trimmed to form the final article as shown in Figure 2.

Referring now to Figures 6, 7, 8 and 9, the method of forming the continuous flange by die pressing is illustrated. A lower die member is shown at 40 and this member is provided with a trough 42, having a side, 44. The upper die member is provided with a downwardly bowed body 48, having a side 50, adapted to cooperate with the side 44, to form the flange in the sheet material. The material is clamped by a holding die 52', while the upper die 46 moves downwardly to engage the material which forms the flange. As it moves downwardly the material provided in the corrugations is acted upon in the manner just described.

In Figure 3 the corrugations have been shown as being tapered in form, the reason for this being that the extreme lower edge of the formed flange requires more material than the intermediate areas require. By providing tapered corrugations more material is provided at this lower area and less material at intermediate areas, and thus even drawing is attained. The corrugations, however may be formed of any desirable shape to suit different manufacturing conditions without departing from the spirit of the invention. Where the flange to be formed is irregular in its shape, or where it is to be provided with an appended flange or other embellishment, the corrugations may be shaped to accommodate the form of the finished article, and by proper judgment in designing the corrugation, an even draw may be obtained regardless of the shape of the finished article.

The invention is not to be limited to the exact arrangement of parts shown in the accompanying sheet of drawing or described in this specification, as various changes in the details of manufacture may be resorted to without departing from the spirit of the invention. Only insofar as the invention is pointed out is the invention to be limited.

What I claim is:

1. The method of making an angular draw which comprises pre-forming on the margin of a blank to be subjected to the draw a series of corrugations throughout the area of the draw and laterally on each side thereof extending substantially in the direction of the draw and decreasing in size on each side of the angle of the draw, and thereafter making the draw by causing the metal to flow along the sides of the angle into the body of the angle.

2. The method of making an angular draw which comprises pre-forming on the margin of a blank to be subjected to the draw a series of corrugations extending a distance on each side of the angle of the draw and decreasing in size on each side of the angle of the draw, and thereafter making the draw by causing the metal to flow along the sides of the angle into the body of the angle.

3. The method of making an interior angled draw which comprises pre-forming on the margins of the blank of the interior angle to be subjected to the draw, a series of corrugations extending along each branch of the angle from the apex a distance remote from the apex and into regions of the margin not deleteriously effected by the sharpness of the draw at the apex, and drifting the metal of the corrugations from regions remote toward the apex, thereby to supplement the metal derived from the immediate region of the apex with metal derived from regions remote from the apex.

In testimony whereof I hereunto affix my signature.

JOHN P. TARBOX.